(12) United States Patent
Syed

(10) Patent No.: US 10,992,940 B2
(45) Date of Patent: *Apr. 27, 2021

(54) PRESERVING IMAGE QUALITY IN TEMPORALLY COMPRESSED VIDEO STREAMS

(71) Applicant: Comcast Cable Communications, LLC, Philadelphia, PA (US)

(72) Inventor: Yasser F. Syed, La Crescenta, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/193,564

(22) Filed: Nov. 16, 2018

(65) Prior Publication Data

US 2019/0261003 A1 Aug. 22, 2019

Related U.S. Application Data

(63) Continuation of application No. 15/925,261, filed on Mar. 19, 2018, now Pat. No. 10,708,599, which is a
(Continued)

(51) Int. Cl.
*H04N 19/159* (2014.01)
*H04N 19/154* (2014.01)
(Continued)

(52) U.S. Cl.
CPC ......... *H04N 19/159* (2014.11); *H04N 19/154* (2014.11); *H04N 19/167* (2014.11); *H04N 19/40* (2014.11)

(58) Field of Classification Search
None
See application file for complete search history.

(56) References Cited

U.S. PATENT DOCUMENTS 5,659,539 A 8/1997 Porter et al.
6,112,226 A 8/2000 Weaver et al.
(Continued)

FOREIGN PATENT DOCUMENTS

EP 2549757 A3 6/2016
WO 2011027507 A1 3/2011

OTHER PUBLICATIONS

European Search Report—EP App 12173831.4—dated May 19, 2016.
(Continued)

*Primary Examiner* — Reza Aghevli
(74) *Attorney, Agent, or Firm* — Banner & Witcoff, Ltd.

(57) ABSTRACT

When a temporally compressed video stream is decoded and subsequently re-encoded, quality is typically lost. The quality loss may be mitigated using information about how the source video stream was encoded during the re-encoding process. According to some aspects of the disclosure, this mitigation of quality loss can be facilitated by decoders that output such information and encoders that receive such information. These decoders and encoders may be separate devices. The functionality of these decoders and encoders may also be combined in a single device, such as a transcoding device. An example of the information that may be used during re-encoding is whether each portion of the original stream was intra-coded or non-intra-coded.

20 Claims, 10 Drawing Sheets

Related U.S. Application Data continuation of application No. 15/091,167, filed on Apr. 5, 2016, now Pat. No. 9,955,170, which is a continuation of application No. 13/182,633, filed on Jul. 14, 2011, now Pat. No. 9,369,723.

(51) Int. Cl.
*H04N 19/167* (2014.01)
*H04N 19/40* (2014.01)

(56) References Cited

U.S. PATENT DOCUMENTS

| | | | |
|---|---|---|---|
| 6,119,154 A | 9/2000 | Weaver et al. | |
| 8,270,469 B2* | 9/2012 | Chui | H04N 19/70 375/240.01 |
| 9,369,723 B2* | 6/2016 | Syed | H04N 19/159 |
| 9,955,170 B2* | 4/2018 | Syed | H04N 19/159 |
| 2002/0047892 A1* | 4/2002 | Gonsalves, Jr. | H04N 21/4788 348/14.06 |
| 2002/0159523 A1 | 10/2002 | Wang et al. | |
| 2002/0163967 A1* | 11/2002 | Youn | H04N 19/126 375/240.12 |
| 2002/0186769 A1* | 12/2002 | O'Brien | H04N 19/40 375/240.12 |
| 2003/0233464 A1* | 12/2003 | Walpole | H04N 21/631 709/231 |
| 2003/0236904 A1* | 12/2003 | Walpole | H04N 21/631 709/231 |
| 2007/0074266 A1* | 3/2007 | Raveendran | H04N 19/36 725/135 |
| 2007/0098064 A1* | 5/2007 | Au | H04N 19/176 375/240.03 |
| 2007/0156924 A1 | 7/2007 | Ramalingam et al. | |
| 2007/0230566 A1* | 10/2007 | Eleftheriadis | H04N 19/593 375/240.1 |
| 2008/0107185 A1 | 5/2008 | Lefol et al. | |
| 2009/0086816 A1* | 4/2009 | Leontaris | H04N 19/15 375/240.03 |
| 2009/0097560 A1 | 4/2009 | Robertson | |
| 2010/0104015 A1* | 4/2010 | Chatterjee | H04N 19/103 375/240.16 |
| 2010/0118982 A1 | 5/2010 | Chatterjee et al. | |
| 2010/0260269 A1* | 10/2010 | He | H04N 19/895 375/240.27 |
| 2010/0296580 A1 | 11/2010 | Metoevi et al. | |
| 2010/0296581 A1 | 11/2010 | Metoevi et al. | |
| 2010/0309977 A1* | 12/2010 | Andersson | H04N 19/157 375/240.12 |
| 2011/0090960 A1* | 4/2011 | Leontaris | H04N 19/154 375/240.12 |
| 2011/0142125 A1 | 6/2011 | Tripathi et al. | |
| 2012/0063515 A1* | 3/2012 | Panchal | H04N 19/463 375/240.16 |
| 2012/0063967 A1 | 3/2012 | Tokuhiro et al. | |
| 2012/0076207 A1* | 3/2012 | Schmit | H04N 19/46 375/240.16 |
| 2012/0176540 A1* | 7/2012 | Labrozzi | H04N 21/4312 348/468 |
| 2013/0039411 A1* | 2/2013 | Aoki | H04N 19/61 375/240.03 |
| 2019/0068975 A1* | 2/2019 | Syed | H04N 19/159 |
| 2019/0261003 A1 | 8/2019 | Syed | |

OTHER PUBLICATIONS

Nov 1, 2002—"Drift Compensation for Reduced Spatial Resolution Transcoding"—Yin, Peng et al—IEEE.
Jan. 1, 2002—"Drift compensation architectures and techniques for reduced-resolution transcoding"—Yin, Peng et al.—Visual Communications and Image Processing.
Mar. 1, 2001—"Object-Based Transcoding for Adaptable Video Content Delivery"—Vetro, Anthony et al.—IEEE.
Mar. 1, 2003—"Video transcoding architectures and techniques: an overview"—Christopolous, Charilaos et al.—IEEE.
Yasser Syed, "Keeping Video Quality Pristine Throughout the Production Process—Introducing 10-Bit 4:2:2 AVC/H.264 Encoding", SMPTE Conference, Oct. 27-29, 2009.
Dec. 28, 2017—Canadian Office Action—CA 2,779,869.
Jan. 4, 2018—European Office Action—EP 12173831.4.
Nov. 20, 2018—Canadian Office Action—CA 2,779,869.
Oct. 15, 2019—Canadian Office Action—CA 2,779,869.
Dec. 20, 2019—European Office Action—EP 12173831.4.
Oct. 6, 2020, European Summons to attend oral proceedings, EP 12173831.4.
Oct. 9, 2020, Canadian Office Action, CA 2,779,869.

* cited by examiner

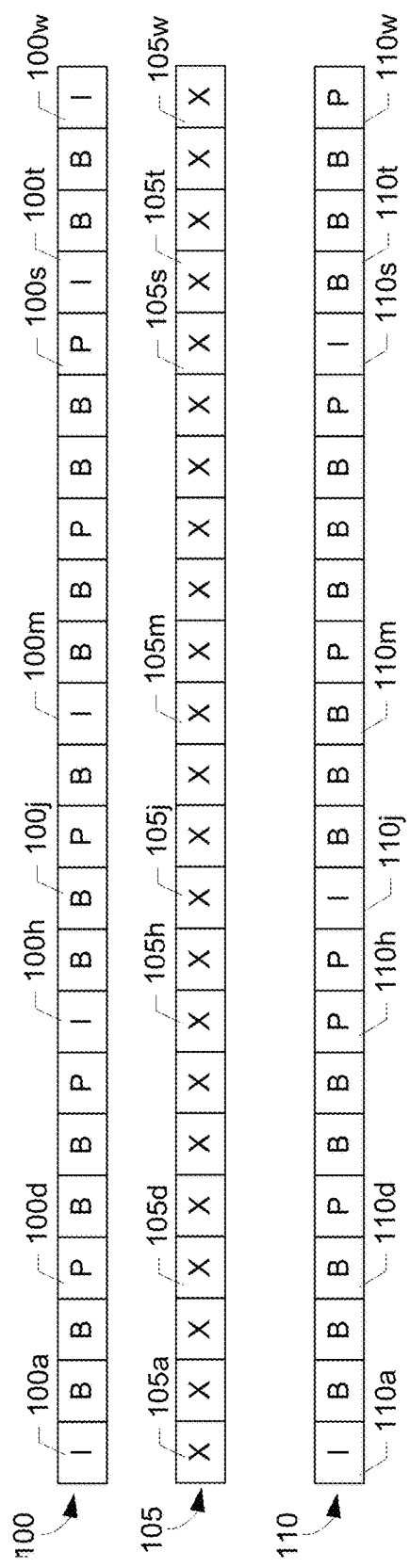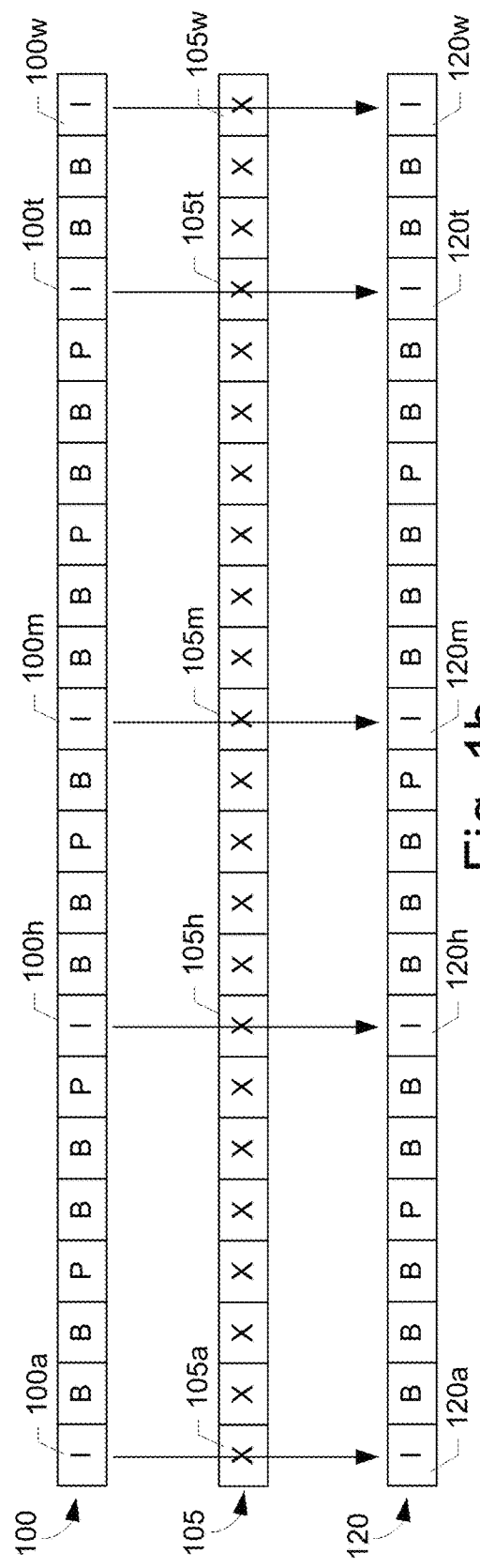
Fig. 1a
Fig. 1b

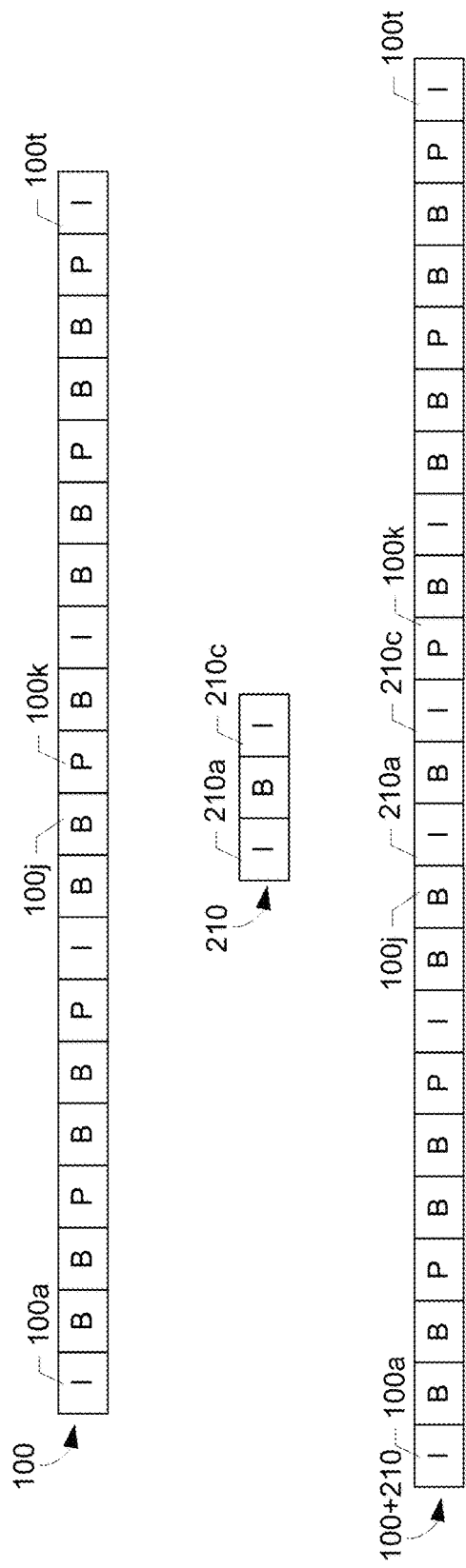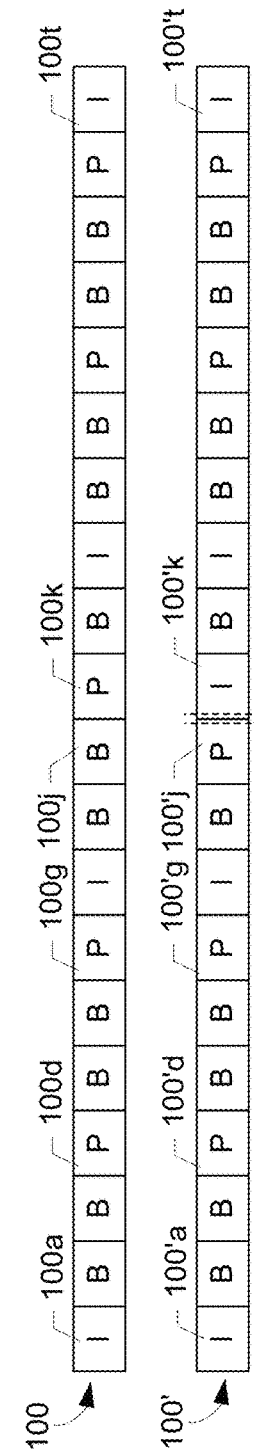
Fig. 2b
Fig. 2c

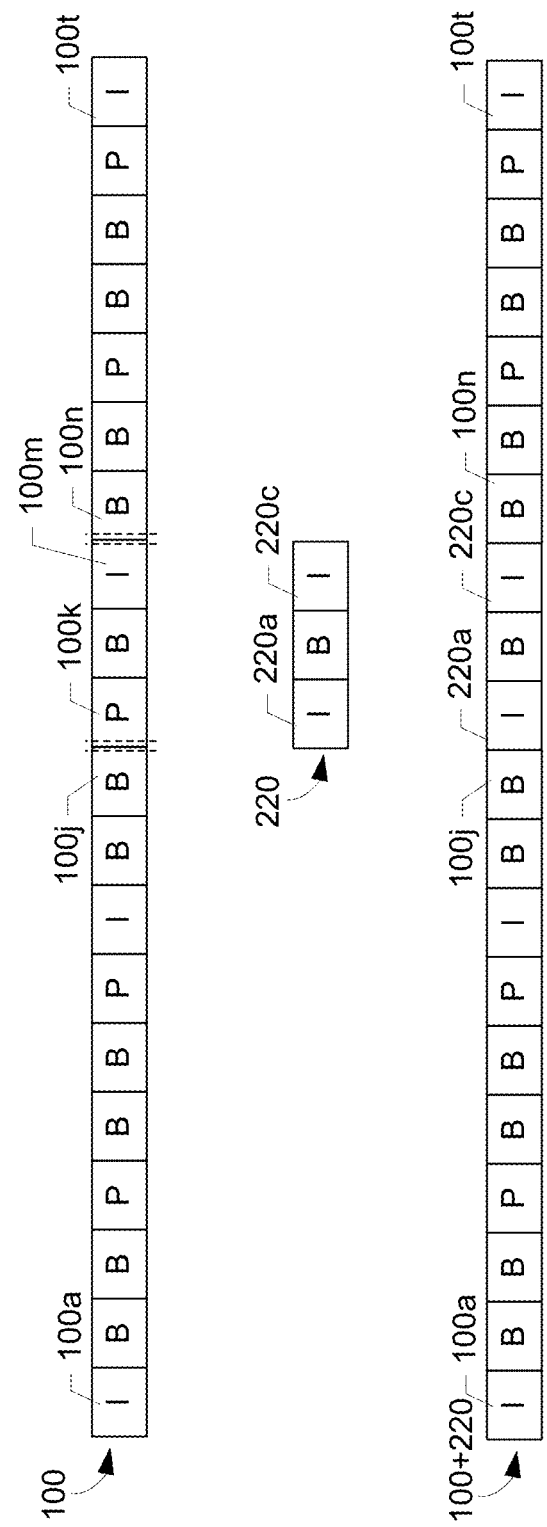

PRESERVING IMAGE QUALITY IN TEMPORALLY COMPRESSED VIDEO STREAMS

CROSS-REFERENCE TO RELATED APPLICATIONS

This application is a continuation of U.S. patent application Ser. No. 15/925,261, filed Mar. 19, 2018, and entitled "Preserving Image Quality in Temporally Compressed Video Streams," which is a continuation of U.S. patent application Ser. No. 15/091,167, filed Apr. 5, 2016, and entitled "Preserving Image Quality in Temporally Compressed Video Streams," now U.S. Pat. No. 9,955,170, issued Apr. 24, 2018, which is a continuation of U.S. patent application Ser. No. 13/182,633, filed Jul. 14, 2011, and entitled "Preserving Image Quality in Temporally Compressed Video Streams," now U.S. Pat. No. 9,369,723, issued Jun. 14, 2016, the contents of each of which are incorporated herein by reference in their entirety.

BACKGROUND

Video content is often compressed in order to save bandwidth during distribution. Some video compression standards, such as MPEG-2 and MPEG-4, part 10 (also known as AVC or h.264), utilize temporal compression. An example of temporal compression is encoding the image in a region, such as a frame or a portion of a frame, by referring to an earlier and/or later region. For instance, the image in a region may be encoded by the following three components: (1) a reference to an earlier region, (2) a motion vector, which specifies how the image from the earlier region should be moved, and (3) a residual error region that indicates how the image created from components (1) and (2) should be further modified. Encoding in this manner often requires less data than specifying the image without reference to an earlier region.

Regions that specify an image without reference to any other images are referred to as intra-coded. Intra-coded regions provide an initial image that temporally compressed regions may reference. Intra-coding may also save space. For example, the first image of a new scene may differ significantly from previous images. As a result, the above-referenced motion vector and residual error region may require more data to describe the image than would intra-coding and may also result in a greater loss of quality than intra-coding.

Where an intra-coded region is a whole frame, the frame is often referred to as an I-frame. (The "I" stands for intra-coded.) Non-intra-coded frames are often referred to as P-frames or B-frames. P-frames, or forward predicted frames, are frames that refer to an earlier frame in order to specify an image. (The "P" stands for predictive.) The three components described in the example above may constitute a P-frame. B-frames are frames that may refer to both an earlier frame and a later frame to specify an image. (The "B" stands bi-predictive.) The frames that these non-intra-coded frames refer to may be either intra-coded or non-intra-coded.

In some video compression schemes, each frame is divided up into regions. In some compression schemes these regions are known as slices. Further, frames may be divided into regions due to use of interlaced encoding instead of progressive scan encoding. Like entire frames, regions, such as slices, may be intra-coded or non-intra-coded. An I-frame may be made up of I-slices, a P-frame made up of P-slices, and a B-frame made up of B-slices. However, frames may also intermix regions, such as slices, of various types. For example, a frame may include some regions that are intra-coded and some regions that are non-intra-coded.

With most known video compression techniques, including those that use temporal compression, image quality is lost each time the video is encoded or transcoded. The quality loss may occur, for example, because intra-coded images and the above-referenced residual error regions are often spatially compressed. During the encoding or transcoding process, techniques such as spatial compression techniques (e.g., discrete cosine transforms and chroma subsampling) are often performed such that some image quality is lost during encoding in order to save space. Quality loss that occurs when a video is encoded or transcoded may be noticeable to a viewer. The loss may be amplified if an already encoded video is decoded and then encoded again. Thus, a need exists for systems and methods that help to minimize the quality loss that occurs when video is encoded, transcoded, or otherwise processed.

SUMMARY

Some aspects of the disclosure relate to methods and systems for decoding a video stream such that information about how the video stream was encoded is not lost. For example, information about which regions of the decoded stream were intra-coded, predictive-coded, or bi-predictive coded may be output from a decoder.

According to another aspect of the disclosure, encoders may receive an uncompressed video stream along with information relating to how regions of the uncompressed video stream were previously compressed. The encoder may use this information when determining how to encode each region.

According to a further aspect of the disclosure, transcoders may incorporate decoders and encoders that enable information about how the source video stream was encoded when determining how to encode each region.

According to yet another aspect of the disclosure, a source video stream may be packaged with data that identifies future alterations to the video stream, such as points in the video stream where an advertisement may be inserted. A decoder may output some or all of this data in addition to a decoded video stream. An encoder, including a transcoder, may use some or all of this data when determining how to encode each region.

The preceding presents a simplified summary in order to provide a basic understanding of some aspects of the disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

The present disclosure is illustrated by way of example and is not limited in the accompanying figures.

FIG. 1a-1c illustrate examples of how a video stream may be decoded and subsequently re-encoded.

FIG. 2b illustrates an example of how two video streams may be combined.

FIG. 2c illustrates and example of how a video stream may be transcoded to facilitate combining the video stream with another video stream.

FIG. 2d illustrates another example of how two video streams may be combined.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

A video stream may be encoded, decoded, and subsequently re-encoded multiple times before reaching its audience. For example, a movie may first be encoded in a video camera on a movie set. The video from the camera may then be sent to a production studio. The production studio may then decode the video and modify it by, for example, deleting unneeded scenes. The movie, or other item of content, may then be re-encoded and sent to a content distributor, such as a services provider, data access location, television network, etc. The content distributor may decode and edit the video stream again. For example, the content distributor may insert commercials, censor the movie, or add video watermarking.

The video stream may be subsequently decoded and re-encoded in order for more edits to be made. It may also be decoded and re-encoded in order to change its format. For example, the movie may be encoded using MPEG-4, but it may need to be sent to viewers whose display device, television, or other video receiver can only decode MPEG-2. To accommodate such viewers, the MPEG-4 encoded movie may be decoded and then re-encoded using MPEG-2. The process of decoding and subsequently re-encoding a video stream may be referred to as transcoding.

Figure 1C:
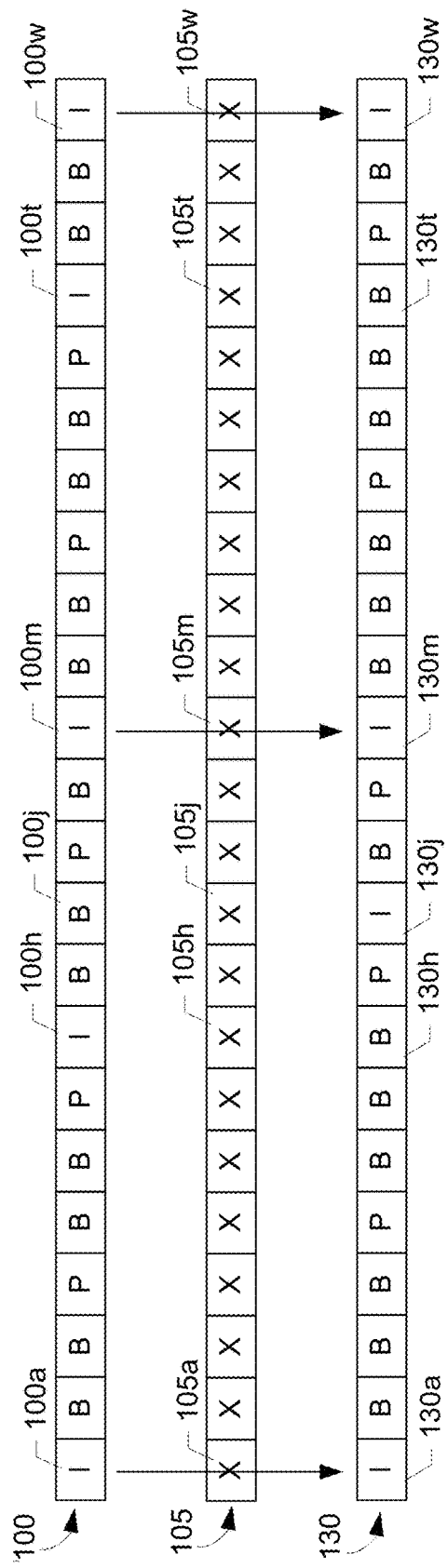

FIGS. 1a-c illustrate three examples of how a temporally compressed video stream 100 may be decoded and subsequently re-encoded. Using FIG. 1a as an example, a source stream, such as video stream 100, is decoded to an uncompressed format, such as video stream 105. Video stream 105 is then encoded to a temporally compressed format, such as video stream 110. Video stream 105 may be, for example, a series of bitmap images. Video streams 100 and 110 may be encoded, for example, using MPEG-2 or MPEG-4. Although edits may be made to the video stream after decoding but prior to encoding, such edits are not shown in FIGS. 1a-c.

The process of decoding and encoding may be separate from one another in both space and time. Alternatively, they may be performed concurrently or sequentially such that the decoding and encoding may not appear to be separate to a user. The intermediate uncompressed format, which is represented by video stream 105, need not be output or kept after it is encoded to create video stream 110.

The format of a transcoded video stream (i.e. a video stream that has been decoded and subsequently re-encoded, such as video stream 110) may differ in one or more aspects from the format of the source video stream, such as video stream 100. Examples of how the formats of video streams may differ include the amount and type of spatial compression applied, the amount and type of temporal compression applied, the codec used to encode the stream, the frame rate of the stream, the resolution of the images of the stream, etc. Although transcoding is often performed in order to change a video stream from one format to another, a video may be decoded and subsequently re-encoded to the same format. This may occur, for example, to facilitate making edits to the video or adding video watermarking. Regardless of whether the format is changed, the process of re-encoding may still cause quality loss.

Each video stream, such as video stream 100, is illustrated as a series of temporally successive regions, each lettered a-w. Each region that contains an intra-coded image is labeled with an "I." Each region that contains a non-intra-coded image is labeled with a "P" or "B" to denote predictive or bi-predictive encoding, respectfully. Each region may be an entire frame, or each region may be a portion of a frame. In examples where each region is only a portion of a frame, a similar series of regions may exist for the other portions of the frame. Each region of video streams that are not temporally compressed, such as video stream 105, is labeled with an "X" instead of an "I," "P," or "B." Each X may represent, for example, an image in a bitmap format.

In FIG. 1a, video stream 100 is transcoded to video stream 110 without regard to whether the intra-coded regions of video stream 100 are also intra-coded in video stream 110. The process begins by decoding video stream 100 to an uncompressed format, which is represented by video stream 105. Then, video stream 105 is encoded to create video stream 110. The images encoded by many regions of video stream 110 are likely to lose quality as compared to video stream 100. Examples of the reasons for quality loss in stream 110 are discussed below.

Quality loss due to spatial compression may occur when an intra-coded image is transcoded to another intra-coded image. For example, the image encoded by region 110a ("image 110a") may be of lower quality than the image encoded by region 100a ("image 100a"). This loss of quality is likely to occur because the spatial compression used to encode image 110a from image 105a is likely to be lossy compression which, by its nature, is likely to lose some information from the source image (105a) in order to save space. The amount of spatial compression applied to an intra-coded image of a video stream, such as image 110a, may be determined based on, for example, a target bit rate for the video stream.

Quality loss may also occur due to spatial compression when a non-intra-coded image, such as image 100j, is transcoded to an intra-coded image, such as image 110j. In addition, a non-intra-coded source image is likely to be of lower quality than an intra-coded source image. A non-intra-coded image, by definition, is encoded by referring to another image, either directly or indirectly. For example, non-intra-coded image 100j may be encoded with reference to intra-coded source image 100h. The residual error region used to describe some of the differences between image 100j and image 100h may be spatially compressed. Thus, the quality losses associated with spatial compression of the residual error region may result in non-intra-coded source images, such as image 100j, having lower quality than intra-coded source images, such as 100h.

Quality loss may occur for at least two reasons when an intra-coded image, such as 100h, is transcoded to a non-intra-coded image, such as 110h. First, the non-intra-coded image is encoded by referring to another image, as described above. For example, image 110h is predictive coded, so it refers to one or more of the temporally previous images 110a-110g. Image 110h may directly refer to image 110a. Image 110h may also refer to image 110a indirectly by way of one or more of images 110b-110g. The above-described quality loss associated with transcoding to an intra-coded image, such as image 110a, is likely to be reflected when transcoding to a non-intra-coded image, such as image 110h, because the non-intra-coded image is encoded by referring, directly or indirectly, to the intra-coded image.

A second reason for quality loss when an intra-coded image is transcoded to a non-intra-coded image is spatial compression of the residual error region that helps describe the differences between the non-intra-coded image, such as 110h, and the image(s) to which the non-intra-coded image refers, such as one or more of 110a-110g. The quality losses associated with spatially compressing this residual error region will be reflected in non-intra-coded images, such as image 110h, in addition to quality losses associated with spatially compressing the images to which the non-intra-coded image refers. The amount of spatial compression applied to the residual error region, like the amount of spatial compression applied to intra-coded images, may be determined based on, for example, a target bit rate for the video stream.

The two reasons for quality loss described above also apply when non-intra-coded images, such as 100d, are transcoded to non-intra-coded images, such as 110d. Further, as discussed above with respect to image 100j, the source image itself is likely to be of lower quality because it is non-intra-coded and therefore subject to the quality losses associated with spatial compression of its residual error region.

In FIG. 1b, video stream 100 is transcoded to video stream 120 such that the regions of video stream 120 that are selected for intra-coding are the same regions that are intra-coded in video stream 100, as indicated by the vertical black arrows. Consequently, and advantageously, the quality loss associated with this transcoding is limited to the losses associated with transcoding intra-coded images to intra-coded images and with transcoding non-intra-coded images to non-intra-coded images. Notably, the additional quality losses associated with transcoding intra-coded images to non-intra-coded images are not present. Further, the larger amount of data typically required for intra-coding is not expended on regions for which the source is less likely to contain a lower-quality, non-intra-coded image. In addition, the non-intra-coded regions of video stream 120 are likely to be of higher quality because the intra-coded regions they reference are likely to have less quality loss. For at least these reasons, intra-coding the regions in video stream 120 that are intra-coded in video stream 100, as shown in FIG. 1b, helps reduce the overall quality loss associated with transcoding. Note that while all of the non-intra-coded regions of video stream 100 are also non-intra-coded in video stream 120, the same type of coding need not be used for each region. Thus, predictive-coded regions are re-encoded as bi-predictive-coded regions and vice versa in this example.

In some instances, the transcoding technique illustrated in FIG. 1b may be performed differently. For example, additional intra-coded regions may be included in the transcoded stream. This may occur, for example, in order to further reduce the quality loss. If the source stream is an MPEG-2 stream, or another stream in which predictive-coded regions tend to have less quality loss than bi-predictive regions, then some or all of the predictive-coded regions may be selected for intra-coding in the transcoded stream. Further, regions that are predictive-coded in the source stream may be selected for predictive-coding in the transcoded stream. This may be particularly useful if the transcoded stream is also in a format where predictive-coded regions tend to have less quality loss than bi-predictive-coded regions because the information about which regions have less quality loss will then be preserved for subsequent transcoding of the video stream. Alternatively, or in addition, less spatial compression may be applied to these higher-quality regions than is applied to other regions. For example, the quantization factors used to compress the result of a discrete cosine transform may be increased to reduce the amount of spatial compression. The amount of spatial compression may also be reduced, for example, by increasing the block size used for a discrete cosine transform. Increasing the number of motion vectors associated with each macroblock is another example of a way to reduce the amount of compression.

Another example of how the transcoding technique illustrated in FIG. 1b may be performed differently is when the transcoded video stream is to have fewer intra-coded regions than the source video stream. This may occur, for example, in order to save space. For instance, a target for the amount of space required to store the video stream in the transcoded format may be set. This target may be specified as an absolute target, or it may be an average bitrate of a video stream. Reducing the number of intra-coded regions may help to meet such a target because intra-coded images generally require more space than non-intra-coded images. Even if the number of intra-coded regions is reduced in the transcoded stream, quality loss can still be mitigated by aligning the intra-coded regions of the transcoded stream with intra-coded regions of the source stream. Because aligning these regions reduces the frequency with which intra-coded images are transcoded to non-intra-coded images, total quality loss may be reduced, as discussed above.

An example of this technique is seen in FIG. 1c. In this example, every other intra-coded region (a, m, and w) of video stream 100 is selected for intra-coding in transcoded video stream 130. Thus, at least for these regions, the quality losses associated with transcoding intra-coded images to non-intra-coded images are not present. Selecting ½ of the intra-coded regions of the source video stream for intra-coding in the transcoded video stream is merely exemplary. The target amount of space allocated to the transcoded stream may lead to any fraction of the intra-coded regions of the source stream being selected. For example, 10%, 20%, 30%, 40%, 60%, 70%, 80%, 90%, 100% or any other percentage of the intra-coded regions of the source stream may be selected for intra-coding in the transcoded video stream. Quality targets other than the amount of space allocated to the transcoded stream may also be used to determine which of the intra-coded regions of the source stream are selected for intra-coding in the transcoded stream. One example is that some or all IDR intra-coded regions of a source stream may be selected in order to facilitate seamless switching between streams in a multiple bitrate streaming environment, as will be discussed in more detail below. Another example of a quality target is a target percentage of the intra-coded regions of the source stream that will be intra-coded in the transcoded stream. Similarly, an average distance between intra-coded regions of the transcoded stream may be maintained, with the distance between individual intra-coded regions differing such that some or all of the intra-coded regions of the transcoded stream align with the intra-coded regions of the source video stream. This average distance may be specified in a variety of different ways, including, for example, a number of seconds (or fractions thereof), a number of frames, or an amount of space occupied by intervening regions, such as a number of bytes. By using these techniques, all of the regions that are intra-coded in the transcoded video stream will also be intra-coded in the source video stream.

Additionally, in some implementations non-intra-coded regions of the transcoded video stream, such as region 130h, that are transcoded from intra-coded regions of the source stream, such as region 100h, may be encoded with less spatial compression than other non-intra-coded regions. This may be done in order to mitigate the quality loss to these images for which the source image is expected to have higher quality.

In some implementations, regions of the transcoded video stream may be intra-coded even where the corresponding region of the source video stream is not intra-coded. For example, region 130j is intra-coded even though region 100j is not. Such additional intra-coded regions may or may not be included in the ratios and/or average distances between intra-coded regions discussed above. In addition to mitigating average quality loss, intra-coded regions that do not align with intra-coded regions of the source video stream may occur, for example, because adding another non-intra-coded region would result in too much estimated quality loss for a specific region or group of regions; because intra-coding the particular region requires less space than non-intra-coding; or because data associated with the stream indicates than an IDR (instantaneous decoding refresh) intra-coded region is appropriate, as will be discussed in more detail below with reference to FIGS. 2a-c. In some implementations, the factors that would otherwise cause an intra-coded image to be added at region j, such as those listed above, would instead result in a nearby region that aligns with an intra-coded image in the source stream being intra-coded. For instance, 130h may be intra-coded instead of 130j in some implementations. By using these techniques, all or substantially all of the regions that are intra-coded in the transcoded video stream may still be regions that are intra-coded in the source video stream. The above-listed reasons for including an intra-coded region in a transcoded video stream that does not align with an intra-coded region in the source video stream are expected to be rare. Thus, the number of regions that are intra-coded in the transcoded video stream that are not intra-coded in the source video stream may be less than 10%, less than 5%, or less than 1% of the intra-coded regions in the transcoded video stream.

Figure 2A:
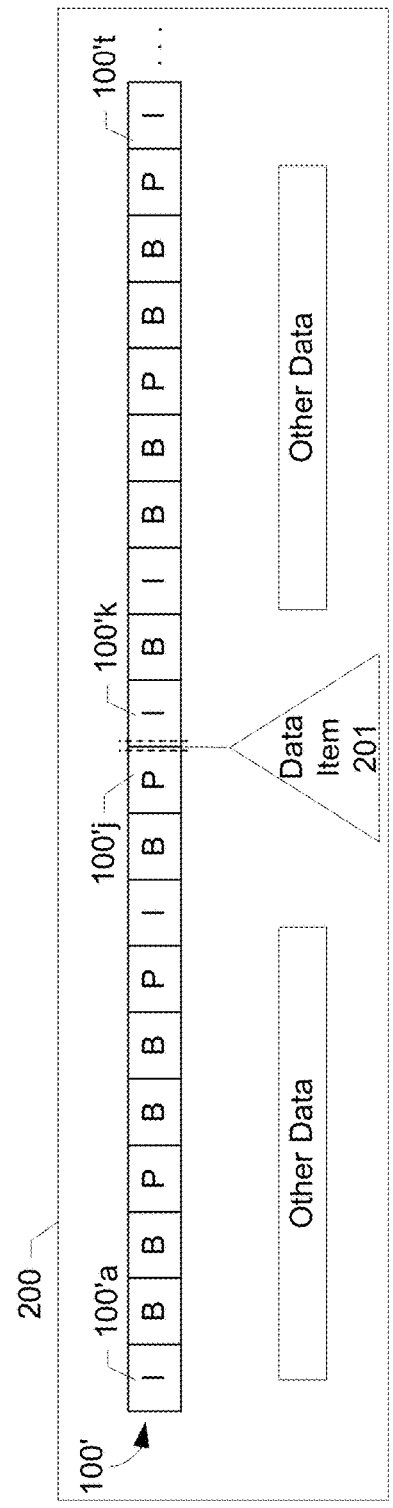
FIG. 2a illustrates an example of how a video stream may be packaged with other information.

A video stream may be packaged with additional information. For example, the video stream may be contained within a container, such as a transport stream, or otherwise accompanied by other information. In the example of FIG. 2a, video stream 100' is packaged with other data, including data item 201, in container 200. A video stream may be packaged with information about a video stream, such as a title or other identifier of the stream and time stamps of various points in the stream. This information may be useful, for example, when synchronizing an audio stream with the video stream. In some instances, the information packaged with the video stream indicates a potential change to the video stream. For example, data item 201 indicates that video stream 210 may be added to video stream 100' at the point in video stream 100' that occurs immediately after region 100'j.

FIG. 2b shows video stream 100, video stream 210, and an example of how these two video streams may be combined in response to a data item, such as data item 201. Notice that region 100k, which appears after video stream 210, is predictive-coded and therefore references regions of video stream 100 that occur before video stream 210. Similarly, region 100j, which occurs before video stream 210, is a bi-predictive region and therefore references regions that occur after video stream 210. Although video stream 210 contains only three regions in FIG. 2b, it may contain many more regions. If so, references to other regions that span the point at which video stream 210 is to be inserted may become overly burdensome for a video player to decode. For example, such references may result in regions being fetched twice. This would happen, for instance, if region 100k was fetched in order to decode region 100j, but region 100k had to be discarded from memory in the process of playing video stream 210. After video stream 210 ends, region 100k would have to be re-fetched. Similarly, because region 100k references earlier regions, such as 100j, those earlier regions may also need to be re-fetched if they too were discarded from the player's memory.

To avoid such issues, a video stream, such as video stream 100, may be encoded in a way that guarantees that no region prior to the point identified by an insert command refers to a region after the point. Similarly, the video stream may also be encoded in a way that guarantees that no region after the insertion point refers to a region prior to the insertion point. An encoder may guarantee both of these conditions by limiting the regions to which non-intra-coded regions may refer.

One example of how an encoder may guarantee that no references are made across a point is limiting the window of regions that the encoder searches for images that are similar to the image currently being encoded. For example, an encoder may normally encode the current image by searching the 5 temporally previous regions and the 5 temporally successive regions for the image that is most similar to the image currently being encoded.

The current image may then be encoded as a non-intra-coded image that refers to the image identified as the most similar. However, if the normal search window crosses the insertion point, then the window may be modified to avoid crossing the point. For example, if the insertion point occurs 3 regions after the region that is currently being encoded, then the search window may be reduced to include the 5 temporally previous regions, but only the 3 temporally successive regions. Alternatively, the search window may be shifted to avoid crossing the insertion point while maintain the same size. For example, the window may contain the 7 temporally previous regions and the 3 temporally successive regions. This technique guarantees that no references are made across the insertion point if it is applied when each image is encoded.

Another example of an encoding technique that guarantees that no references are made across a point is to initially select the regions to which each image refers normally, but to modify the selection if it involves a reference across the point. For example, region 100g, may normally refer to region 100d, which refers to intra-coded region 100a. Because neither of these references crosses the point immediately after region 100j, region 100g may be encoded as it normally would. However, region 100j may normally refer to region 100k. Because the reference from 100j to 100k crosses the point, this initial selection may be modified in favor of a region that does not cross the point, such as 100h. The revised selection for which other regions to reference when encoding image 100j may be made on the basis of trial and error, or it may be made by searching within a window of allowable regions, similar to the technique described above.

In some cases, avoiding references across an insertion point may result in intra-coding a region that normally would have been non-intra-coded. For instance, region 100k may normally have been predictive coded, but disallowing references across the point immediately before region 100k may make intra-coding the most efficient way to encode image 100k.

Intra-coded regions that are not followed by any references to regions prior to the intra-coded region are sometimes called an IDR (instantaneous decoding refresh) regions. IDR regions may be decoded as if they are the first region in the stream. Thus, playback beginning at IDR regions may be instantaneous. An encoder may include an IDR region immediately after an insertion point.

Although a point across which references should not be made may be a point identified by an insert command, such as data item 201, it may also be a point identified by any command or other data that indicates that playback may be interrupted and/or any command or other data that indicates that information may be added to the video stream. The data that identifies the point may be included with a source video stream, such as stream 100. Alternatively, the data that identifies the point may be created or otherwise first associated with the video stream after it has been decoded (i.e. during the transcoding process). In either case, a video stream, such as video stream 100', may be encoded to avoid references that span the point, as described above.

Referring to FIG. 2c, video stream 100' is an example of what video stream 100 may look like if it were encoded using the techniques described above to avoid references across the point immediately after region 100j. Unlike region 100j, region 100'j does not reference any future regions; it is predictive-coded instead of a bi-predictive coded. Unlike region 100k, region 100'k does not reference any previous regions; it is intra-coded instead of predictive-coded. Of course, still further modifications may be made. For example, if region 100i references region 100k, region 100'i may be encoded to refer only to regions at or prior to 100'j. This may be done even if region 100'i and region 100i are both bi-predictive-coded.

In the example above, no regions of the video stream 100 were dropped when it was combined with video stream 210. In other examples, such as the example shown in FIG. 2d, regions of video stream 100 may be dropped when it is combined with another video stream in response to a data item, such as data item 201. In this example, the data item indicates that video stream 220 is to be inserted beginning at the point between region 100j and 100k. As seen in the combined video stream labeled 100+220, the inserted video stream 220 replaces regions 100k-100m of original video stream 100. This replacement ends at the point between regions 100m and 100n. This end point may be defined by the end of video stream 220. The end point may also be defined independent of the length of video stream 220. For example, an absolute location in the video stream or location that is defined relative to another point may be provided. At the end point, video stream 220 stops being inserted and original video stream 100 resumes. In the example seen in FIG. 2d, the end point occurs just before region 100n, so region 100n is the first region of the combined video stream that occurs after the inserted video stream 220. An example of a signal that may define beginning and end points as described above is an SCTE-35 signal.

As seen in FIG. 2d, the combination of video streams 100 and 220 may be problematic for similar reasons to those discussed above with reference to FIG. 2b. For example, regions 100j and 100n, among others, may reference region 100m, which has been replaced in the combined stream shown in FIG. 2d. Thus, decoding these regions may require knowledge of this replaced intra-coded region. Modifying video stream 100 to avoid references that span the beginning point and to avoid references that span the end point avoids this problem. Video stream 100 may be so modified using the techniques described above. Further, the techniques described above need not be applied to the regions that are to be omitted from the combined stream. In the example of FIG. 2d, region 100j may be encoded as described above to avoid references across the insertion point, but region 100k may be encoded without regard to the insertion point because it will be omitted.

In many of the examples of transcoding discussed so far, the encoder has knowledge of how some or all of the regions being encoded were previously encoded. For example, in FIG. 1b, video stream 120 is encoded from video stream 105, and the encoding is performed using information about which regions of source video stream 100 were intra-coded. This knowledge about the source video stream may be obtained in a variety of ways. If the encoder has access to the source stream, then the decoder may simply consult the source stream to obtain this information. It may do so before beginning the process of encoding, or it may do so as it encodes. Although the obtained information may be saved, it may also be discarded once it is no longer needed, such as once encoding is complete.

The information that the encoder may obtain includes, for example, an identification of all the regions that were intra-coded in the source stream. Alternatively, the encoder may obtain an identification of only certain regions that were intra-coded in the source stream. As seen in the example of FIG. 1c, fewer intra-coded regions may exist in the transcoded stream than exist in the source stream in order to save space. In this example, only the intra-coded regions of the source stream that will also be intra-coded in the trascoded stream (a, m, and w) need to be identified. Additional intra-coded regions of the source stream may be identified but not selected for intra-coding in the transcoded video stream. This may occur, for example, where the decision about which regions will be intra-coded in the transcoded stream has not yet been made.

In some instances, the encoder may obtain identifications of regions that are not intra-coded as well. It may obtain identifications of every non-intra-coded region of the source stream, or it may obtain identifications of only some regions. The encoder may use these identifications in a number of different ways. For example, the encoder may identify regions that are to be intra-coded, regardless of whether the region was intra-coded in the source stream. The encoder may also obtain identifications of regions that are to be encoded with less compression or higher quality than other regions, whether or not those regions are to be intra-coded. These regions may be, for example, predictive-coded regions where the codec used for the source stream makes it likely that predictive-coded regions are of higher quality than other regions. The non-intra-coded regions may be identified separately from identifications of other regions, such as intra-coded regions, or they may be identified together with identifications of other regions. Similarly, each identification may explicitly indicate how the source region was encoded. Alternatively, one or more lists of regions may also be stored without such additional information.

Figure 3:
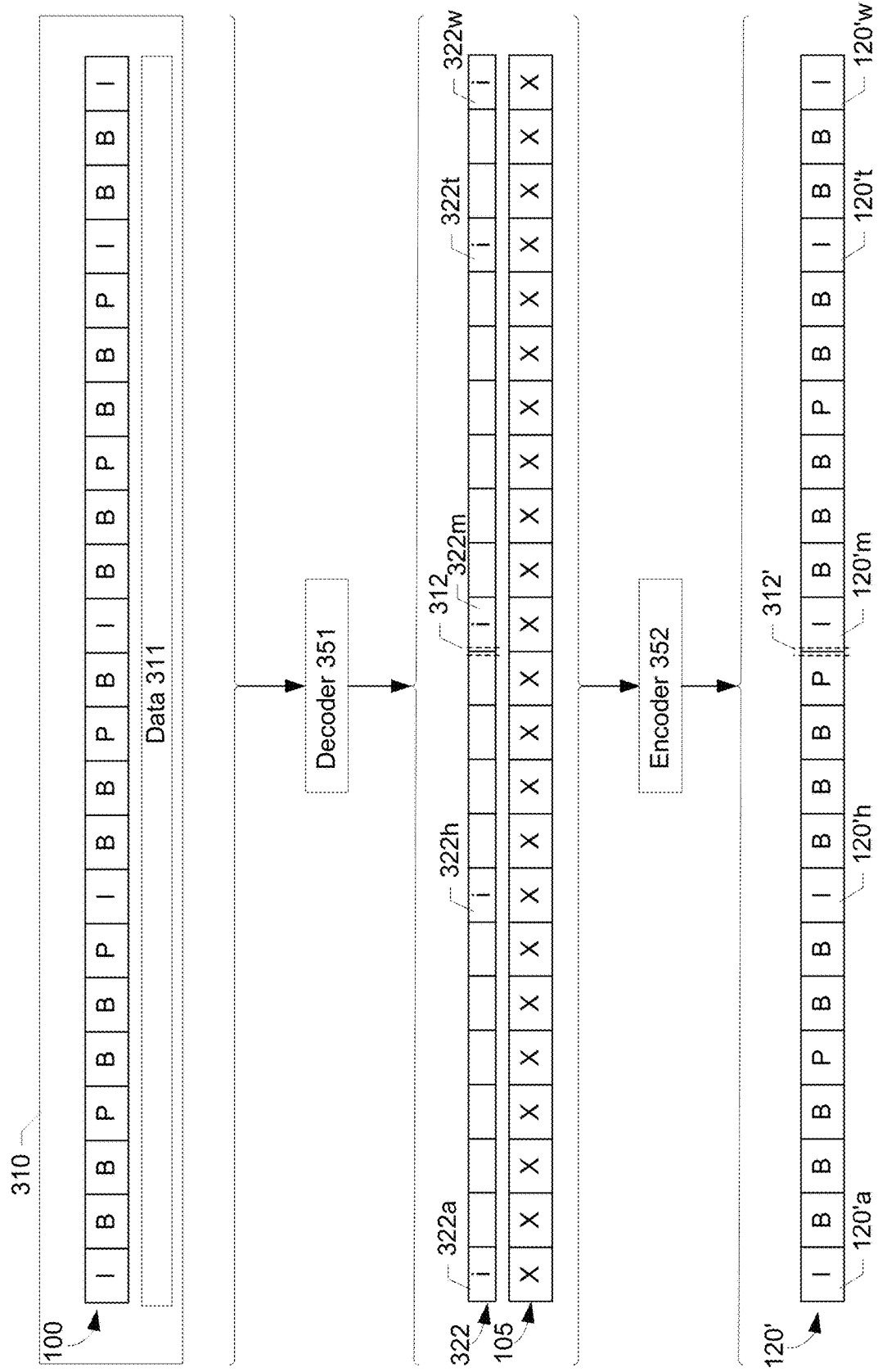
FIG. 3 illustrates an example of the data that may be received by and output from both a decoder and an encoder.
Figure 6:
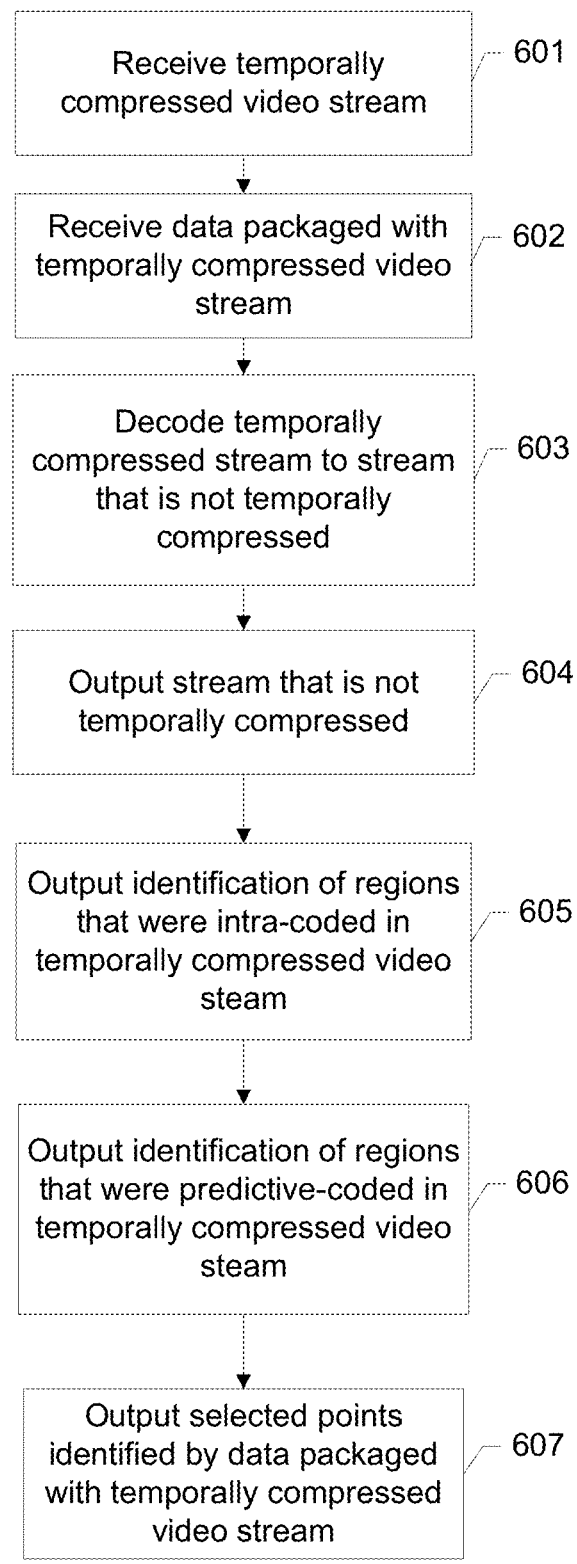
FIG. 6 shows an illustrative example of a method that may be used when decoding a temporally compressed video stream.
Figure 7:
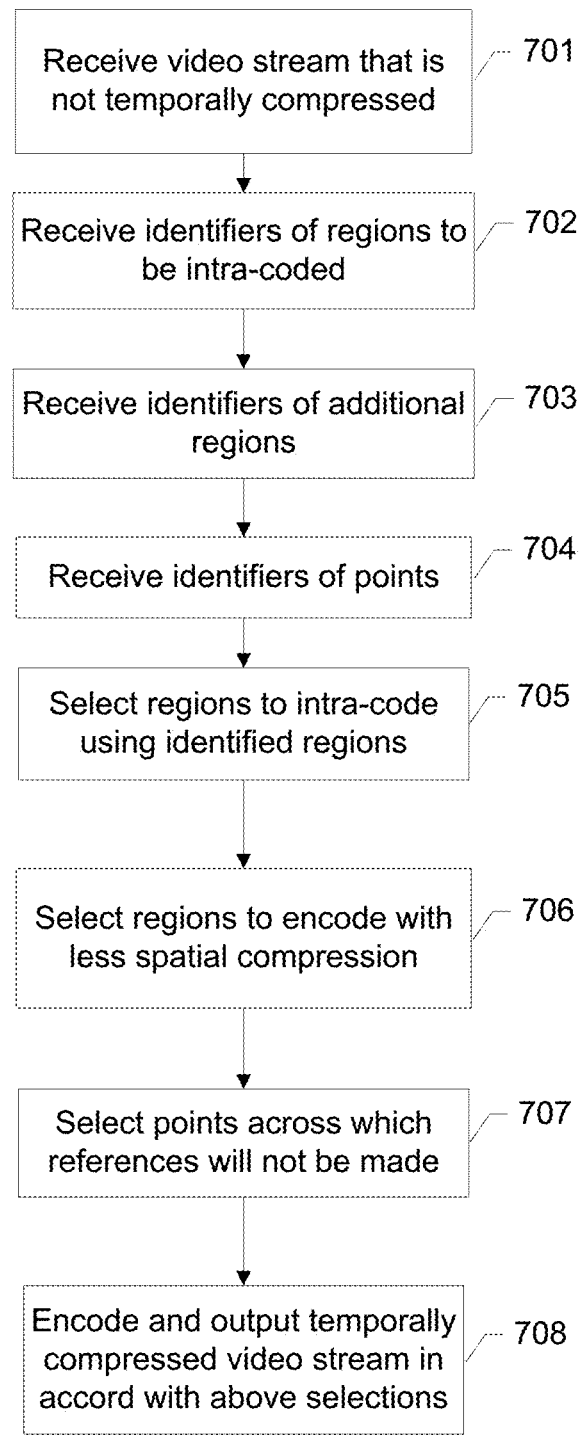
FIG. 7 shows an illustrative example of a method that may be used when encoding a video stream as a temporally compressed video stream.

Although identifications of regions are discussed above with respect to the encoder, the decoder may also identify regions in the same manner as discussed above. An encoder may then receive these identifications and use them when encoding a video stream. FIG. 3 illustrates an example of the data that may be received by and output from both a decoder and an encoder. These data items will be described with reference to a method that may be used by a decoder, which is illustrated in FIG. 6, as well as with reference to a method that may be used by an encoder, which is illustrated in FIG. 7.

In step 601, the decoder receives a temporally compressed video stream, such as video stream 100 as seen in FIG. 3. In step 602, the decoder receives data packaged with the temporally compressed video stream, such as data 311. Data 311 may include, for instance, data indicating that an advertisement is to be inserted into the video stream at point 312. Although a decoder might receive only a video stream in some implementations, the example of FIG. 3 illustrates decoder 351 receiving all of the data in container 310.

In step 603, the decoder decodes the temporally compressed stream such that it is no longer temporally compressed. The decoded stream, such as stream 105, is then output in step 604. The decoded stream may be output to any destination. For example, it may be output directly to an encoder, as shown in FIG. 3, or it may be output to another device, such as a storage media or video editing platform.

In step 605, an identification of regions that were intra-coded in the temporally compressed video stream, such as data 322, is output. Again, the output may be to any destination. In the example of FIG. 3, regions a, h, m, t, and w are identified by data 322. Although a decoder may output an identification of all of the intra-coded regions, it may also output an identification of only some of the intra-coded regions, as discussed above. Further, it may also output identifications of non-intra-coded regions. For example, in step 606 the decoder may output an identification of regions that were predictive-coded in the temporally compressed video stream. A decoder may also output identifications of selected points identified by data packaged with the temporally compressed video stream, as in step 607. Data 322 identifies point 312, which was included in data 311 and may be, for example, an insertion point. Once the data discussed in steps 604-607 is output, the received temporally compressed video stream may be discarded. It need not be output by the decoder, and re-encoding may be performed without reference to the received temporally compressed video stream using the data output in steps 604-607, such as video stream 105 and data 322.

Points and/or regions, such as those in data 322, may be identified in a variety of different ways. For example, a series of flags may be placed in or along with the video stream. For example, the flags may be contained in an MPEG Transport Stream. Each flag may correspond to a region. In this case, intra-coded regions may be identified by whether a flag associated with the region is one that indicates intra-coding. A flag indicating a point may be inserted between flags associated with regions or in positions associated with the regions immediately before or after the point. In the latter case, some flags may indicate both an encoding type, such as intra-coding, and that references should not be made across the point. A flag may be as small as a single bit, such as a 1 to indicate intra-coding and a 0 to indicate other coding.

Other examples of how points and/or regions may be identified include, for example, timestamps. A variety of timestamp formats may be used, including, for example, presentation time stamps (PTS), decoding time stamps (DTS), Society of Motion Picture and Television Engineers (SMPTE) time codes, etc. Alternatively, or in addition, sequence numbers of frames and/or regions may be used.

Where the identified regions are less than an entire frame, a specific region within a frame may be identified by a coordinate or coordinates, region name(s), region number(s), or other identifiers that maps to a portion of a frame. However, a separate identifier of where a region is within a frame may not be needed. For example, a sequence number may identify a specific portion of a frame rather than the frame as a whole. Also, identifiers of regions within frames may be used only where the regions within the frame are to be encoded differently. For instance, if all of the regions within a frame are to be intra-coded, then an identification of the whole frame, such as a time stamp or sequence number alone, may be sufficient.

The information output from a decoder may be received, directly or indirectly, by an encoder, such as encoder 352. Encoder 352 may utilize the method illustrated in FIG. 7.

In step 701, the encoder receives a video stream that is not temporally compressed. In step 702 the encoder receives identifiers of regions to be intra-coded, and in step 703 the encoder received identifiers of additional regions. Finally, in step 704, the encoder received identifiers of points. In FIG. 3, these step are illustrated by encoder 352 receiving data 322 as well as video stream 105. Although data 322 does not happen to include identifiers of regions besides intra-coded regions, it could in other examples.

In step 705, regions to intra-code are selected using the regions identified by the data received in step 702. As discussed above, it is possible to intra-code a greater or fewer number of regions than the number identified by data 322 in order to balance quality and compressions for a given situation.

In step 706, regions to encode with less spatial compression are selected. As discussed above, it may be desirable to encode certain regions with more or less spatial compression than others based on the likely quality of the source image. Examples of such regions may include regions that were identified in step 702 but not selected in step 705 and/or regions identified in step 703.

In step 707, points across which references will not be made, such as insertion points, are selected. Although the example of FIG. 3 illustrates only point 312, additional points, such as additional insertion points, may be included in the data received by the encoder in step 704. Some such points may not be selected as ones across which references may not be made. For example, the video to be inserted at the point may be inserted by the encoder itself; the video to be inserted at the point may not be long enough to warrant avoiding references across it; or the point may not be related to inserting video or otherwise adding data or interrupting the video stream.

In step 708, the video stream is encoded and output in accord with the selections discussed above. In FIG. 3, this is illustrated by the output video stream 120'. In this example, data 322 was used to select each of regions a, h, m, t, and w for intra-coding. Data 322 was also used to ensure that no regions reference other regions across point 312'. Although not shown in FIG. 3, output video stream 120' may be packaged with other data, such as some or all of data 311.

An encoder, such as encoder 352, may receive data, such as data 322 and/or video stream 105, from one or more sources. Some or all of those sources may be external to the encoder, and some or all of the sources may be external to the decoder as well. For example, encoder 352 may receive video stream 105 and data 322 from one or more computers used for editing the video stream. Alternatively, or in addition, an encoder may generate data, such as some or all of data 322, itself.

Figure 8:
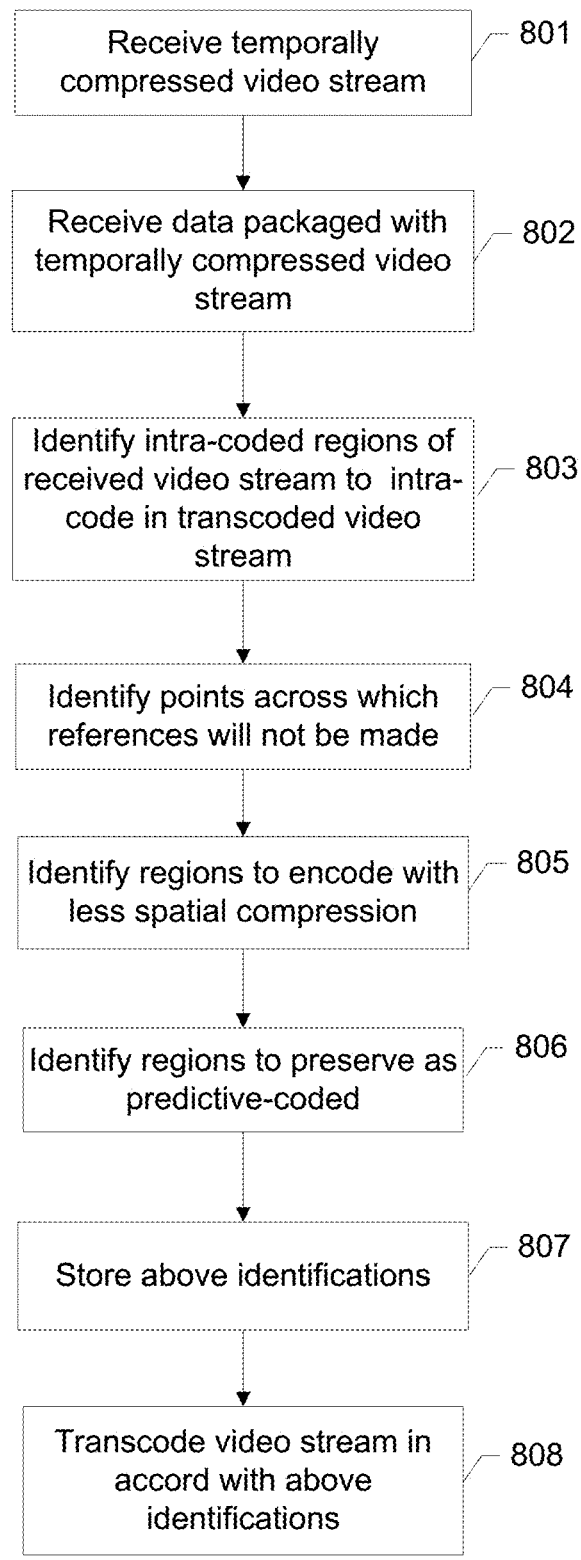
FIG. 8 shows an illustrative example of a method that may be used when transcoding a temporally compressed video stream.

In some instances, a decoder, such as decoder 351, and an encoder, such as encoder 352, may be integrated together into a transcoder. A transcoder may utilize the methods described above with reference to FIGS. 6 and 7. It may also utilize the method described below with reference to FIG. 8.

In step 801 a temporally compressed video stream is received, such as video stream 100 as seen in FIG. 3. This stream may be, for example, an MPEG-4 encoded movie that is to be transcoded to MPEG-2 format. Data packaged with the temporally compressed video stream, such as insertion points, is received in step 802. Intra-coded regions of the received video stream that are also to be intra-coded in the transcoded video stream are identified in step 803. Points across which references will not be made are identified in step 804, and regions to encode with less spatial compression are identified in step 805. The above identification may be performed in a variety of ways, as discussed above with reference to the selections in steps 705, 706, and 707 of FIG. 7. In step 807 the above identifications are stored. They may be stored for later reference, or they may be stored only for use in step 808, in which the video stream is transcoded in accord with the above identifications. In the case where some or all of the steps of the above method are performed repeatedly, such as when transcoding is performed on a region-by-region or scene-by-scene basis, some of the identifications stored in step 807 may be lost before other identifications are first made.

Figure 4:
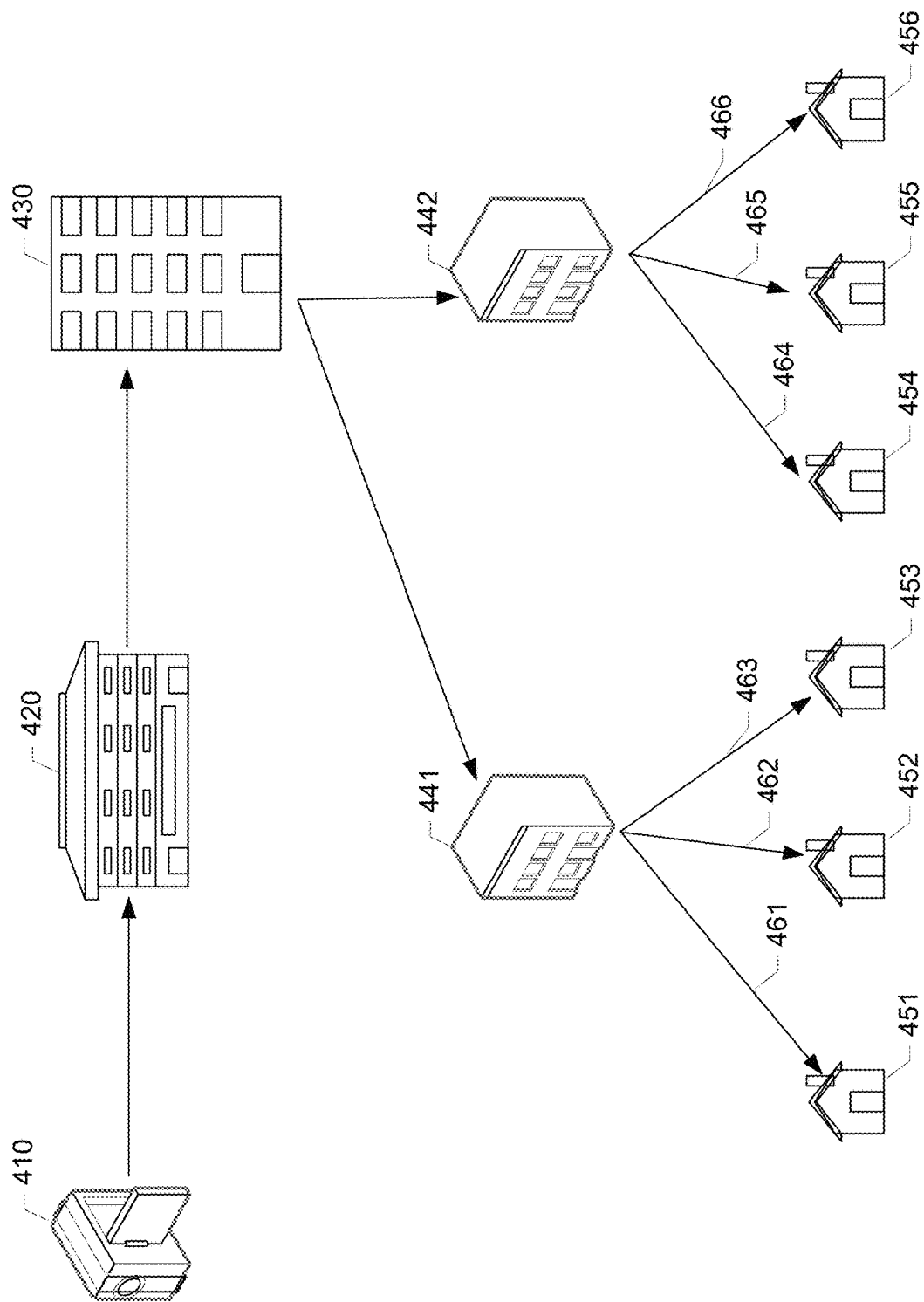
FIG. 4 illustrates an example of how a video stream may be repeatedly decoded and subsequently re-encoded prior to reaching its audience.

A video stream may be transcoded (i.e. decoded and subsequently re-encoded) many times prior to reaching its audience. Using the techniques discussed above to perform some or all of the decodings and re-encodings will likely help to preserve the quality of the video stream that ultimately reaches the audience. As seen in the example of FIG. 4, a video stream may be first encoded in a video camera, such as camera 410. The video stream from the camera may then be edited at a production studio 420. This editing may include decoding and modifying the original images to add special effects or other enhancements. It may also include adding images from other sources, such as other cameras, to the video stream. Data accompanying the decoded video stream, such as data 322, may need to be adjusted to reflect any edits. For example, if a scene is inserted, then the sequence number associated with frames after the scene may change. Once editing is complete, the stream may be re-encoded and sent from production studio 420 to content distributor 430.

Content distributor 430 may further edit the video stream. For example, content distributor 430 may decode the video stream in order to delete scenes and/or insert other video, such as advertisements. Content distributor 430 may also associate data with points in or segments of the video stream. For example, content distributor 430 may associate data that indicates when other video, such as an advertisement, should be added to the stream. An example of such data is an SCTE-35 signal. Such data may be added to the data used by an encoder, such as data 322. Content distributor 430 may then re-encode the video stream and distribute the stream, along with any added data, to regional content distributors, such as regional distributors 441 and 442.

Regional distributors 441 and 442 may insert advertisements but not decode and re-encode the video stream. This is particularly likely if content distributor 430 re-encoded the stream such that non-intra-coded regions do not reference other regions across the point at which the advertisements are to be inserted. Alternatively, regional distributors 441 and 442 may decode the video stream and alter it by, for example, adding advertisements where indicated by data associated with the video stream, such as SCTE-35 signals. The video stream may then be re-encoded and forwarded to, for example, terminals located in homes 451-456. Such terminals may also transcode the video stream. The terminals in this example may be of any type and need not be confined to homes 451-456. They may also be located, for example, in offices or outdoors. Examples of terminals include cellular phones or other devices equipped with cellular radios; computers; home gateways; video receivers, such as those included in a television or separately located in a "set top box;" and any other device capable of displaying and/or outputting a video stream.

In each of the examples of decoding and re-encoding described above, the re-encoded video stream may be encoded in a different format than the stream that was decoded. This may be done, for example, in order to ensure compatibility with the device that is to receive the video stream; to save space on a storage medium, such as a hard drive or optical disk; to avoid over-burdening a communication link; or simply as a matter of preference. For example, regional content distributors 441 and/or 442, may re-encode the video stream in a more compressed format than the format in which it was received in order to enable real-time delivery of the stream over communication links 461-466. Similarly, regional content distributors may re-encode the video stream in a format that is compatible with the terminals in homes 451-456.

FIG. 4 is merely an example of how a video stream may be decoded and re-encoded multiple times. Many other examples are possible. For example, regional content distributors 441 and/or 442 may forward the video streams to further intermediaries instead of directly to the terminals in homes 451-456. Alternatively, fewer cycles of decoding and re-encoding may be present. For example, regional distributors 441 and/or 442 may not exist. Instead, the video stream output from content distributor 430 may be received by terminals in homes 451-456.

The decoding, encoding, and transcoding techniques of this disclosure may be used in conjunction with multiple bitrate streaming. Where multiple bitrate streaming is used, a single item of content may be transmitted in more than one format. For example, the item of content may be transmitted in a high-bandwidth format to terminals capable of receiving this format, but the same item of content may be transmitted in a lower-bandwidth format to terminals that cannot receive the high-bandwidth format. In some examples of multiple bitrate streaming, the format received by a single terminal may be altered in the middle of the content. For example, a video on demand server that uses multiple bitrate streaming may transmit a first portion of a video to a terminal in a first format, but then transmit a second portion of the video to the terminal in a higher- or lower-bandwidth format. The change in format may be made, for example, in response to changes in the bandwidth available on the communications link between the server and the terminal.

A discussed above, a multiple bitrate streaming server may transmit a single piece of content in multiple formats. A copy of the content in all of these formats may be received by the streaming server. Alternatively, a multiple bitrate streaming server may receive the content in only a subset of the formats in which the content may be transmitted from the server. The streaming server can generate additional formats of the content by transcoding one of the copies of the received content. Quality loss can be mitigated by using the highest quality copy of the content for the transcoding. The highest quality copy may be, for example, the copy having the highest bitrate. Quality loss can also be mitigated by performing the transcoding using the techniques described above. The techniques described above are additionally advantageous in the example of multiple bitrate streaming because they can be used to aligning the IDR intra-coded regions of the transcoded stream with the IDR intra-coded regions of the source stream. This alignment allows a streaming server to change between transmitting the source and transcoded streams without transmitting any regions in more than one format. A device other than a streaming server may also generate transcoded streams with the above-described alignment of IDR intra-coded regions. An entire set of aligned streams may be generated, or an existing set of aligned streams may be augmented.

Figure 5:
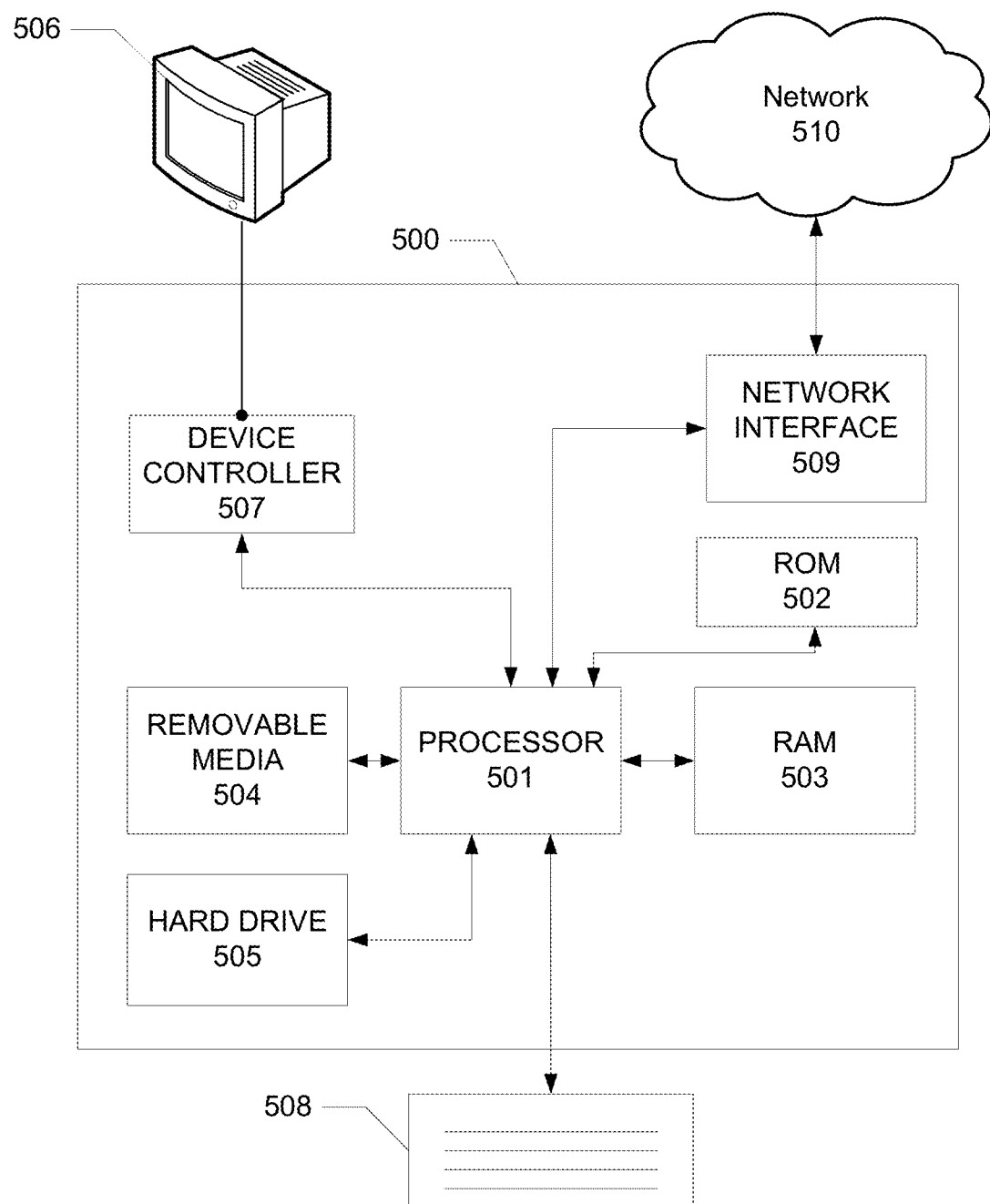
FIG. 5 illustrates an example of general hardware elements that can be used to implement various computing devices, including decoders, encoders, and transcoders.

FIG. 5 illustrates an example of general hardware elements that can be used to implement any of the various computing devices discussed above, such as decoder 351, encoder 352, devices including decoders and encoders (such as transcoders), and terminals 451-456. Each of these computing devices may also be referred to as a processing device. The computing device 500 may include one or more processors 501, which may execute instructions of a computer program to perform any of the features described herein. The instructions may be stored in any type of computer-readable medium or memory, to configure the operation of the processor 501. For example, instructions may be stored in a read-only memory (ROM) 502, random access memory (RAM) 503, removable media 504, such as a Universal Serial Bus (USB) drive, compact disk (CD) or digital versatile disk (DVD), floppy disk drive, or any other desired electronic storage medium. Instructions may also be stored in an attached (or internal) hard drive 505. The computing device 500 may include one or more output devices, such as a display 506 (or an external television), and may include one or more output device controllers 507, such as a video processor. There may also be one or more user input devices 508, such as a remote control, keyboard, mouse, touch screen, microphone, etc. The computing device 500 may also include one or more network interfaces, such as input/output circuits 509 (such as a network card) to communicate with an external network 510. The network interface may be a wired interface, wireless interface, or a combination of the two. In some embodiments, the interface 509 may include a modem (e.g., a cable modem). Network 510 may include communication lines such as optical cables, coaxial cables, Ethernet cables, satellite or other wireless links (including cellular links), etc. Computing device 500 may connect to a plurality of networks simultaneously. Network Interfaces 509 may have dedicated hardware for each network, or some or all of the hardware may serve multiple networks simultaneously.

One or more aspects of the disclosure may be embodied in computer-usable or readable data and/or executable instructions, such as in one or more program modules, executed by one or more processors or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium, as described above. As will be appreciated by one of skill in the art, the functionality of the program modules may be combined or distributed as desired in various illustrative embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of executable instructions and computer-usable data described herein.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps described above may be performed in other than the recited order, including concurrently, and that one or more steps may be optional in accordance with aspects of the disclosure. It will also be appreciated and understood that modifications may be made without departing from the true spirit and scope of the present disclosure. The description is thus to be regarded as illustrative instead of restrictive on the present disclosure.

The invention claimed is:

1. A system comprising:
   a first computing device; and
   a second computing device,
   wherein the first computing device is configured to send, to the second computing device, a first video stream, wherein the first video stream is compressed and comprises a first set of regions that are each intra-coded; and
   wherein the second computing device is configured to:
      receive, from the first computing device, the first video stream;
      select, from the first set of regions and based at least in part on a quality target, a first subset of regions to be intra-coded in a second video stream, wherein the quality target comprises a target percentage of intra-coded regions in the first video stream that will be intra-coded in the second video stream;
      select a second set of regions that are each predictive-coded in the first video stream;
      transcode the first video stream to the second video stream, wherein the second set of regions is transcoded with less spatial compression than an average amount of spatial compression applied to a remainder of non-intra-coded regions in the second video stream; and store the second video stream.

2. The system of claim 1, wherein the second computing device is further configured to:
    select, from the first set of regions, a second subset of regions; and
    transcode the first video stream to the second video stream by compressing, in the second video stream, the second subset of regions with less spatial compression than an average amount of spatial compression applied to non-intra-coded regions in the second video stream.

3. The system of claim 1, wherein the quality target further comprises a target for an amount of space required to store the second video stream.

4. The system of claim 1, wherein the second computing device is further configured to:
    receive, from the first computing device, a plurality of video streams that contain common content, wherein the plurality of video streams comprise the first video stream and a third video stream; and
    select, based on determining that a quality of the first video stream is higher than a quality of the third video stream, the first video stream to transcode.

5. The system of claim 1, wherein the first video stream further comprises a second set of non-intra-coded regions, and
    wherein the second computing device is further configured to transcode the first video stream to the second video stream by:
        intra-coding a first subset of the second set of non-intra-coded regions; and
        inter-coding a second subset of the second set of non-intra-coded regions with less spatial compression than other non-intra-coded regions in the second video stream.

6. The system of claim 1, wherein the second set of regions is selected based on a format of the first video stream.

7. The system of claim 1, wherein the second computing device is further configured to:
    receive data associated with the first video stream; and
    select, based on the data indicating a point at which a third video stream will be inserted in the second video stream and from the first video stream, one or more regions to be intra-coded as instantaneous decoding refresh regions in the second video stream.

8. An apparatus comprising:
one or more processors; and
memory storing instructions that, when executed by the one or more processors, cause the apparatus to:
    receive a first video stream that is compressed and comprises a first set of regions that are each intra-coded;
    select, from the first set of regions and based at least in part on a quality target, a first subset of regions to be intra-coded in a second video stream, wherein the quality target comprises a target percentage of intra-coded regions in the first video stream that will be intra-coded in the second video stream;
    select a second set of regions that are each predictive-coded in the first video stream;
    transcode the first video stream to the second video stream, wherein the second set of regions is transcoded with less spatial compression than an average amount of spatial compression applied to a remainder of non-intra-coded regions in the second video stream; and
    store the second video stream.

9. The apparatus of claim 8, wherein the instructions further cause the apparatus to:
    select, from the first set of regions, a second subset of regions, and
    transcode the first video stream to the second video stream by compressing, in the second video stream, the second subset of regions with less spatial compression than an average amount of spatial compression applied to non-intra-coded regions in the second video stream.

10. The apparatus of claim 8, wherein the quality target further comprises a target for an amount of space required to store the second video stream.

11. The apparatus of claim 8, wherein the instructions further cause the apparatus to:
    receive a plurality of video streams that contain common content, wherein the plurality of video streams comprise the first video stream and a third video stream; and
    select, based on determining that a quality of the first video stream is higher than a quality of the third video stream, the first video stream to transcode.

12. The apparatus of claim 8, wherein the first video stream further comprises a second set of non-intra-coded regions, and
    wherein the instructions further cause the apparatus to transcode the first video stream to the second video stream by:
        intra-coding a first subset of the second set of non-intra-coded regions; and
        inter-coding a second subset of the second set of non-intra-coded regions with less spatial compression than other non-intra-coded regions in the second video stream.

13. The apparatus of claim 8, wherein the instructions further cause the apparatus to select the second set of regions based on a format of the first video stream.

14. The apparatus of claim 8, wherein the instructions further cause the apparatus to:
    receive data associated with the first video stream; and
    select, based on the data indicating a point at which a third video stream will be inserted in the second video stream and from the first video stream, one or more regions to be intra-coded as instantaneous decoding refresh regions in the second video stream.

15. One or more non-transitory, computer-readable storage media storing instructions that, when executed, cause:
    receiving a first video stream that is compressed and comprises a first set of regions that are each intra-coded;
    selecting, from the first set of regions and based at least in part on a quality target, a first subset of regions to be intra-coded in a second video stream, wherein the quality target comprises a target percentage of intra-coded regions in the first video stream that will be intra-coded in the second video stream;
    selecting a second set of regions that are each predictive-coded in the first video stream;
    transcoding the first video stream to the second video stream, wherein the second set of regions is transcoded with less spatial compression than an average amount of spatial compression applied to a remainder of non-intra-coded regions in the second video stream; and
    storing the second video stream.

16. The one or more non-transitory, computer-readable storage media of claim 15, wherein the instructions, when executed, further cause:
  selecting, from the first set of regions, a second subset of regions, and
  transcoding the first video stream to the second video stream by compressing, in the second video stream, the second subset of regions with less spatial compression than an average amount of spatial compression applied to non-intra-coded regions in the second video stream.

17. The one or more non-transitory, computer-readable storage media of claim 15, wherein the quality target further comprises a target for an amount of space required to store the second video stream.

18. The one or more non-transitory, computer-readable storage media of claim 15, wherein the instructions, when executed, further cause:
  receiving a plurality of video streams that contain common content, wherein the plurality of video streams comprise the first video stream and a third video stream; and
  selecting, based on determining that a quality of the first video stream is higher than a quality of the third video stream, the first video stream to transcode.

19. The one or more non-transitory, computer-readable storage media of claim 15, wherein the first video stream further comprises a second set of non-intra-coded regions, and
  wherein the instructions, when executed further cause transcoding the first video stream to the second video stream by:
    intra-coding a first subset of the second set of non-intra-coded regions; and
    inter-coding a second subset of the second set of non-intra-coded regions with less spatial compression than other non-intra-coded regions in the second video stream.

20. The one or more non-transitory, computer-readable storage media of claim 15, wherein the instructions, when executed, further cause:
  receiving data associated with the first video stream; and
  selecting, based on the data indicating a point at which a third video stream will be inserted in the second video stream and from the first video stream, one or more regions to be intra-coded as instantaneous decoding refresh regions in the second video stream.

\* \* \* \* \*